US008435621B2

(12) United States Patent
Aravamudan

(10) Patent No.: US 8,435,621 B2
(45) Date of Patent: May 7, 2013

(54) ARTIFICIAL STONE FIBER COMPOSITES

(76) Inventor: Gosakan Aravamudan, Bangalore (IN)

( * ) Notice: Subject to any disclaimer, the term of this patent is extended or adjusted under 35 U.S.C. 154(b) by 268 days.

(21) Appl. No.: 12/859,263

(22) Filed: Aug. 19, 2010

(65) Prior Publication Data

US 2011/0045228 A1 Feb. 24, 2011

(30) Foreign Application Priority Data

Aug. 19, 2009 (IN) ........................... 1979/CHE/2009

(51) Int. Cl.
*B44F 9/04* (2006.01)
*B32B 3/02* (2006.01)
*B44C 1/26* (2006.01)
*B44C 3/12* (2006.01)

(52) U.S. Cl.
USPC ............................. 428/67; 52/309.3; 428/143

(58) Field of Classification Search .................... 428/67, 428/143; 52/309.3
See application file for complete search history.

(56) References Cited

U.S. PATENT DOCUMENTS 3,350,827 A * 11/1967 Sugar ........................... 52/309.3

* cited by examiner

*Primary Examiner* — Brent O'Hern
(74) *Attorney, Agent, or Firm* — Ash Tankha; Lipton, Weinberger & Husick

(57) ABSTRACT

A surface material is provided for furniture and building structures. The surface material comprises a layer of artificial stone and a layer of fiber reinforced resin. The surface material may further comprise a separator material, for example, a metal strip, a fiber strip, etc. that defines partially or wholly a boundary edge of the layer of artificial stone. The layer of fiber reinforced resin partially or fully encompasses the artificial stone and/or the separator material on all sides and surfaces except exposed decorative surfaces. The surface material may further comprise a decorative material comprising, for example, ornamental glass, semiprecious stones, metal art, colored quartz, glass, stone jewelry, etc. embedded within the layer of artificial stone. The surface material is used to cover a central core for forming the furniture and the building structures.

4 Claims, 6 Drawing Sheets

ARTIFICIAL STONE FIBER COMPOSITES

CROSS REFERENCE TO RELATED APPLICATIONS

This application claims the benefit of provisional patent application number 1979/CHE/2009 titled "Artificial Stone Fiber Composites", filed on 19 Aug. 2009 in the Indian Patent Office.

The specification of the above referenced patent application is incorporated herein by reference in its entirety.

BACKGROUND

This invention, in general, relates to building structures. More particularly, this invention relates to a body structure for furniture and building structures, for example, doors, tables, windows, etc.

Wood and its derivatives, for example, plywood, medium density fiberboard, etc. are currently the preferred choice of material for fabrication of doors and windows in most parts of the world. Building structures and fixtures, for example, doors and windows consume a large quantity of wood and place a large burden on our already shrinking environmental resources. There is an urgent need for a substitute for wood in building structures that will reduce the environmental impact and also address the following disadvantages of utilizing wood.

If not properly taken care of, wood has a limited life. Wood may decay when exposed to moisture for long periods, and is also prone to termite attacks. In tropical countries with excess rainfall, wood expands seasonally due to excess moisture content, due to which doors and windows get jammed and are therefore unworkable. Wood and its derivatives, for example, plywood, medium density fiberboard, etc. create bulky constructions. For example, most doors and window products made of wood are an inch thick. Moreover, if colored images are to be applied on wood, it has to be in the form of coatings. However, coatings on wood or its derivatives have a limited life. These coatings may discolor or peel off. Wood is also not amenable to be worked into a variety of surface textures.

Another limitation of wooden doors and windows is the higher cost of material, and accruing cost of fabrication. Furthermore, the construction of wooden doors and windows may require skilled labor.

Hence, there is an unmet need for overcoming the above mentioned drawbacks associated with the existing materials used for fabricating doors and windows. Moreover, there is a need for a long-standing structure as frequent replacements for doors and windows may be cumbersome and expensive.

Furthermore, there is a need for materials that possess properties, for example, abrasion resistance, dirt resistance, moisture resistance, shock resistance, fire resistance, frost resistance, thermal shock resistance, stain resistance, chemical resistance, and color permanence in order to achieve long durability.

Glass fiber reinforced plastic (FRP) doors are not aesthetically pleasing, and therefore there is a need to integrate attractive decorative surfaces in FRP doors without affecting the structural integrity of FRP doors.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The surface material disclosed herein addresses the above mentioned needs for a substitute for wood in building structures that reduces the environmental impact and overcomes the drawbacks of utilizing wood. The surface material for furniture and building structures disclosed herein comprises a layer of artificial stone and a layer of fiber reinforced resin. Furniture structures such as doors comprise a wooden frame. As the surrounding border of the surface material disclosed herein comprises the layer of fiber reinforced resin, the surrounding border can be bonded to the wooden frame of a furniture structure easily, as opposed to bonding the layer of artificial stone directly to the wooden frame with difficulty. In the known art, fiber reinforced resin is referred to as fiber reinforced plastic (FRP). The surface material disclosed herein also enables integration of attractive decorative surfaces in glass fiber reinforced plastic (FRP) doors without affecting the structural integrity of the FRP doors. Furthermore, the surface material disclosed herein allows the use of artificial stone decorative layers integrated within the surface of furniture and building materials that utilize fiber reinforced resin.

The layer of fiber reinforced resin partially or fully encompasses the artificial stone on all sides and surfaces except one or more exposed decorative surfaces. The surface material disclosed herein is used to cover a central core for forming furniture and building structures. The surface material disclosed herein is used for manufacturing doors, tables, murals, furniture, and building structures.

In an embodiment, the surface material disclosed herein further comprises a decorative material embedded within the layer of artificial stone. The decorative material comprises, for example, one or more of ornamental glass, semiprecious stones, metal art, colored quartz, glass, stone jewelry, etc.

In another embodiment, the surface material disclosed herein further comprises a separator material defining partially or wholly a boundary edge of the layer of artificial stone. The separator material is, for example, a metal strip, a fiber strip, a combination thereof, etc. The layer of fiber reinforced resin partially or fully encompasses the artificial stone and/or the separator material on all sides and surfaces except exposed decorative surfaces.

The layer of artificial stone and the layer of fiber reinforced resin are manufactured simultaneously, whereby bonding between the layer of artificial stone and the layer of fiber reinforced resin is formed in situ.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1A:
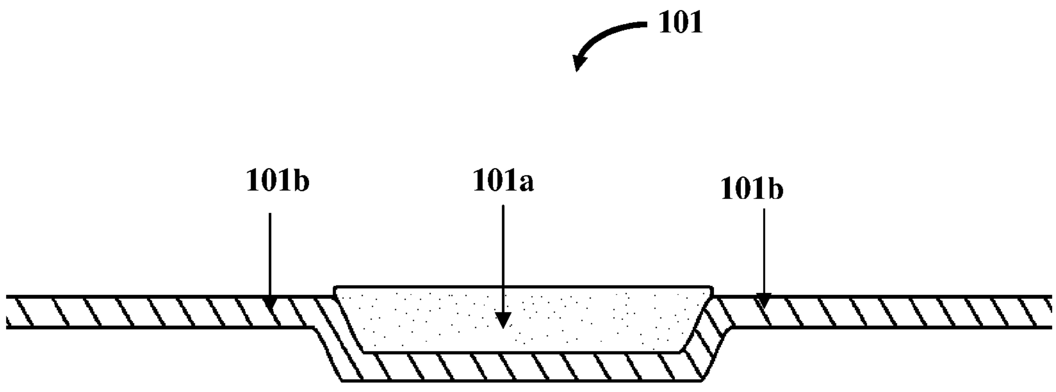
FIG. 1A exemplarily illustrates a sectional view of a surface material for furniture and building structures.
Figure 1B:
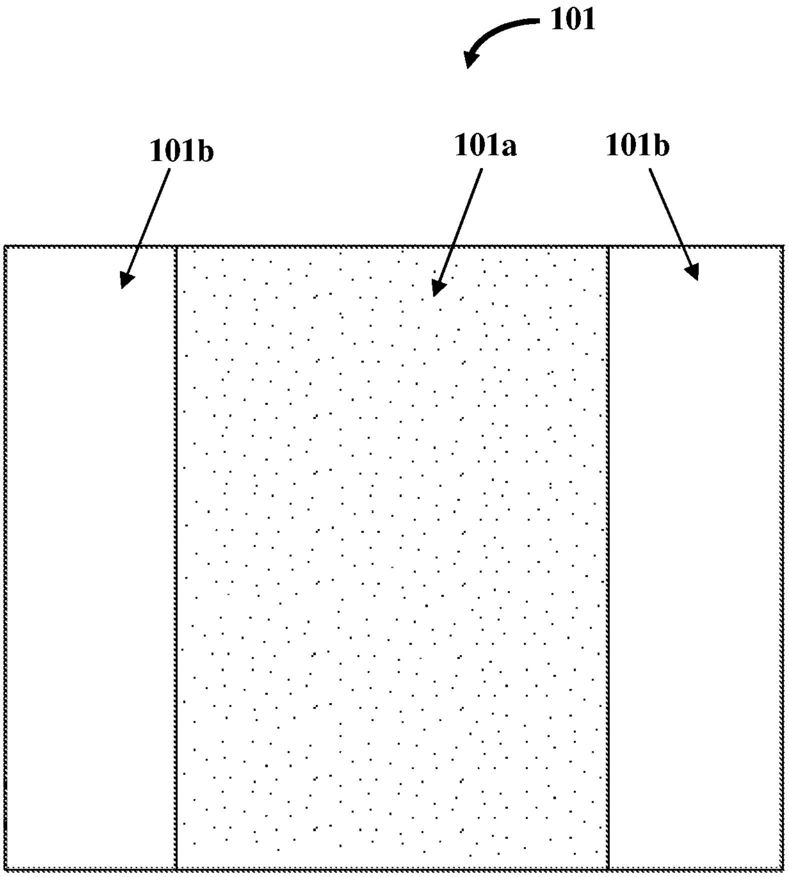
FIG. 1B exemplarily illustrates a top view of the surface material for furniture and building structures.
Figure 2:
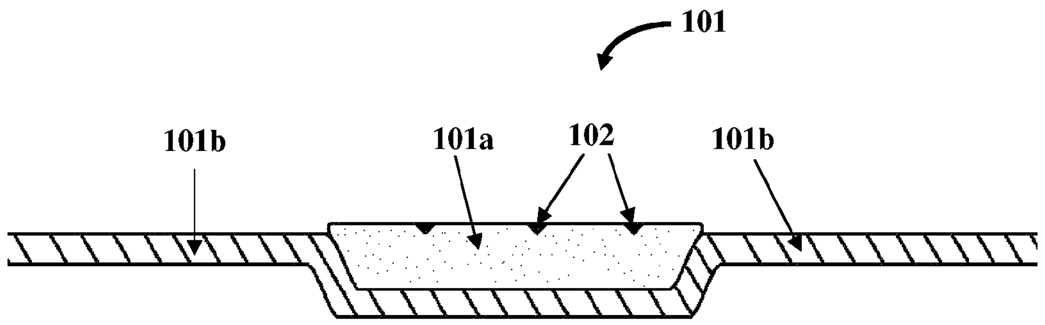
FIG. 2 exemplarily illustrates a sectional view of the surface material for furniture and building structures, wherein a layer of artificial stone of the surface material is embedded with a decorative material.

FIG. 1A exemplarily illustrates a sectional view of a surface material 101 for furniture and building structures. The surface material 101 disclosed herein comprises a layer 101*a* of artificial stone herein referred to as an "artificial stone layer" and a layer 101*b* of fiber reinforced resin herein referred to as a "fiber reinforced resin layer". A top view of the surface material 101 disclosed herein is exemplarily illustrated in FIG. 1B. In an embodiment, the surface material 101 disclosed herein further comprises a decorative material 102 embedded within the artificial stone layer 101*a* of the surface material 101 as exemplarily illustrated in FIG. 2. The decorative material 102 comprises, for example, one or more of ornamental glass, semiprecious stones, metal art, colored quartz, glass, stone jewelry, etc. The fiber reinforced resin layer 101*b* partially or fully encompasses the artificial stone layer 101*a* on all sides and surfaces except exposed decorative surfaces. An example of the fiber reinforced resin is glass fiber reinforced with polyester resin.

Figure 3:
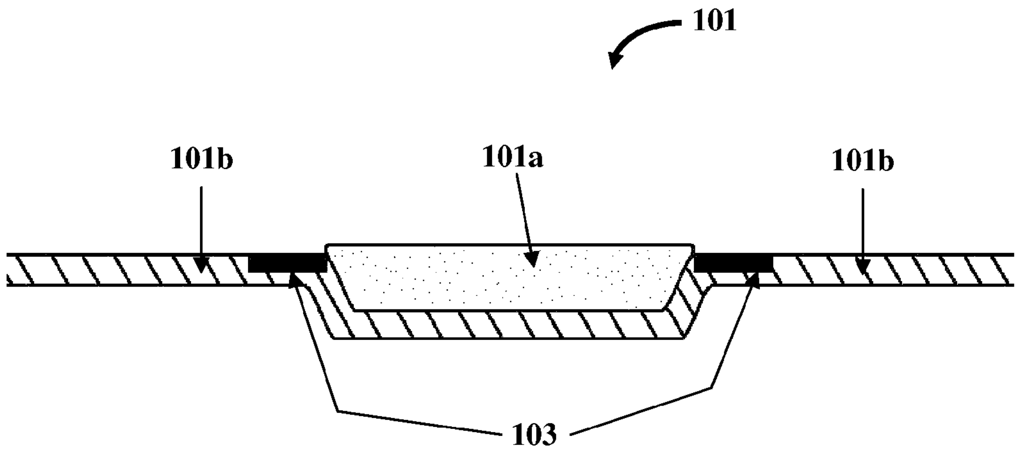
FIG. 3 exemplarily illustrates a sectional view of the surface material for furniture and building structures, wherein a boundary edge of a layer of artificial stone of the surface material is partially defined by a separator material.

In an embodiment, the surface material 101 disclosed herein comprises the artificial stone layer 101*a*, a separator material 103, and the fiber reinforced resin layer 101*b* as exemplarily illustrated in FIG. 3. The separator material 103 defines partially or wholly a boundary edge of the artificial stone layer 101*a*. FIG. 3 exemplarily illustrates a sectional view of the surface material 101 for furniture and building structures, wherein a boundary edge of the artificial stone layer 101*a* of the surface material 101 is partially defined by a separator material 103. The separator material 103 is, for example, a metal strip, a fiber strip, a combination thereof, etc. In this embodiment, the fiber reinforced resin layer 101*b* partially or fully encompasses the artificial stone layer 101*a* or the separator material 103 on all sides and surfaces except the exposed decorative surfaces.

The separator material 103 may have multiple cavities or pores, whereby the continuity of a resin system in the artificial stone layer 101*a* and in the adjoining fiber reinforcement reduces the chance of structural failure or delamination in the boundary of the artificial stone layer 101*a* and fiber reinforcement. The resin system in the artificial stone layer 101*a* and in the adjoining fiber reinforced resin layer 101*b* of the surface material 101 disclosed herein comprises, for example, polyester resins such as isothalic neopentyl glycol with a styrene monomer, and acrylic resins such as methyl methyl acrylate based polymers.

Figure 4:
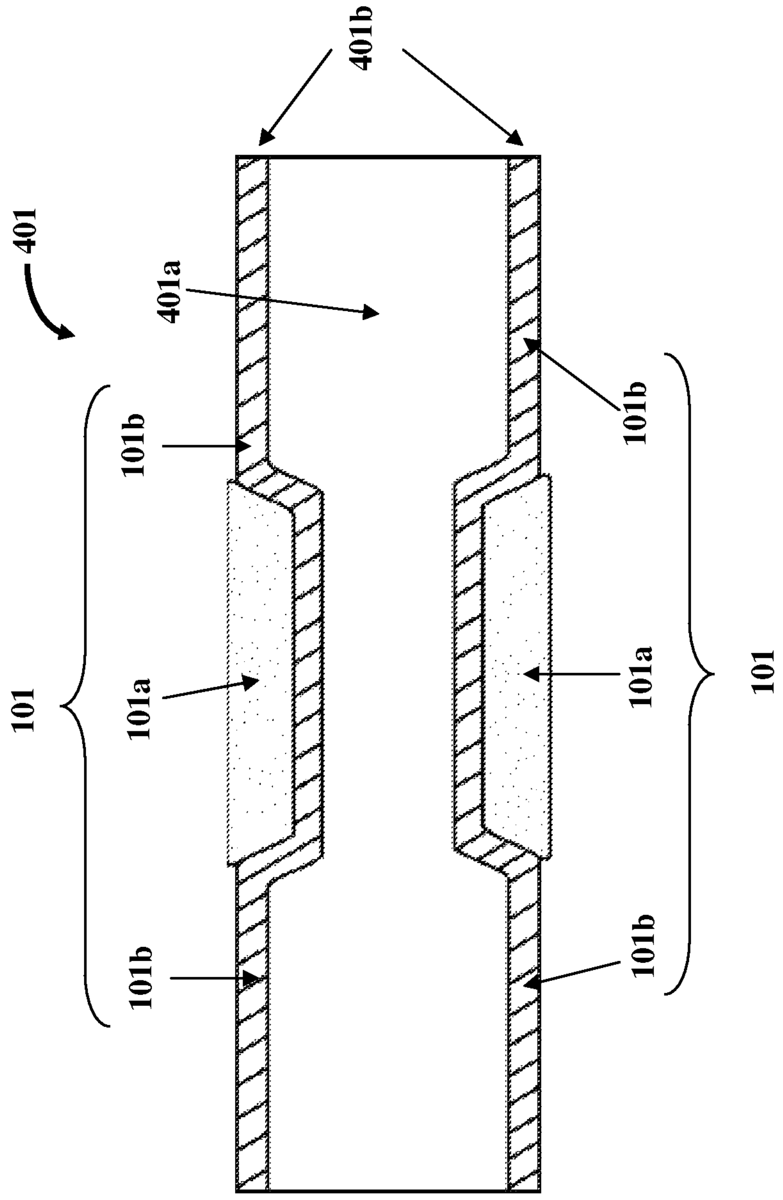
FIG. 4 exemplarily illustrates a sectional view of the surface material covering a central core for forming furniture and building structures.

In an embodiment, the surface material 101 disclosed herein is used to cover a central core 401*a* for forming building and furniture structures such as doors. FIG. 4 exemplarily illustrates a sectional view of the surface material 101 covering a central core 401*a* for forming furniture and building structures. The central core 401*a* comprises, for example, honeycomb, polyurethane foam, a medium density fiberboard, wood and its derivatives, etc. Disclosed herein is also the use of the surface material 101 for manufacturing doors, tables, murals, furniture, building structures, etc. The body structure 401 for the furniture and building structures comprises the central core 401*a* comprising, for example, one or a combination of structural foam and porous ceramic, and two skins 401*b* made of the artificial stone layer 101*a* with the adjoining fiber reinforced resin layer 101*b*.

In another embodiment, the body structure 401 for a table comprises a central core 401*a* or a panel of honeycomb placed between a top panel and a bottom panel 401*b* of the surface material 101 disclosed herein. Each of the top panel and the bottom panel 401*b* of the surface material 101 disclosed herein comprises the artificial stone layer 101*a* and the adjoining fiber reinforced resin layer 101*b*. The honeycomb in the central core 401*a* is, for example, a paper honeycomb, reinforced plastic honeycomb, plastic honeycomb, an aluminum honeycomb, etc.

Figure 5:
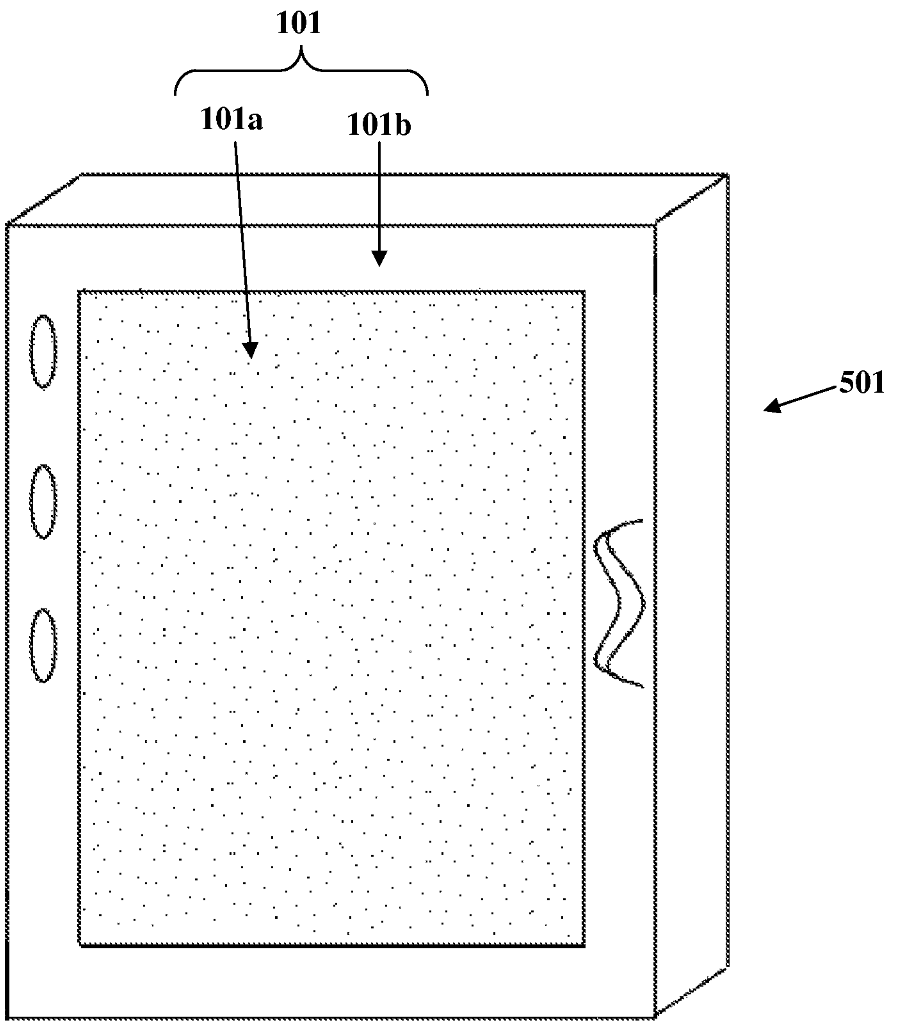
FIG. 5 exemplarily illustrates a door manufactured using the surface material comprising a layer of artificial stone and an adjoining layer of fiber reinforced resin.

FIG. 5 exemplarily illustrates a door 501 manufactured using the surface material 101 comprising the artificial stone layer 101*a* and the adjoining fiber reinforced resin layer 101*b*. The surface material 101 disclosed herein is, for example, used to manufacture a door 501 as exemplarily illustrated in FIG. 5. The central core 401*a* of the door 501 comprises, for example, structural foam such as polyurethane foam. The artificial stone layer 101*a* is, for example, about 4 millimeters (mm) in height, and the adjoining fiber reinforced resin layer 101*b* is, for example, about 1.5 mm in height. The heights of the artificial stone layer 101*a* and the fiber reinforced resin layer 101*b* may vary from the above quoted figures.

The body structure 401 for the door 501 or other furniture comprises a central core 401*a* and two skins 401*b* of the surface material 101 comprising the artificial stone layer 101*a* with the adjoining fiber reinforced resin layer 101*b* as exemplarily illustrated in FIG. 4. The central core 401*a* comprises, for example, one or a combination of structural foam and porous ceramic. The structural foam is, for example, polyurethane foam. The fiber reinforced resin is a glass fiber preferably or may be one of or a mix of glass fibers, carbon fibers, ceramic fibers, metal wires, and aramid yarn. Decorative material 102 comprising, for example, one or more of ornamental glass, semiprecious stones, metal art, colored quartz, glass or stone jewelry, etc. may be embedded within the artificial stone layer 101*a*. The artificial stone layer 101*a* further comprises particulates and resin. The particulates are, for example, composed of quartz or composed of one or more of quartz, granite, glass, ceramic, etc. The size of the particulates may vary, for example, from a fine powder to about 2 mm. The size distribution may follow Fuller's formula so as to achieve maximum compaction. The resin is, for example, a polyester resin. An example of the polyester resin is a combination of about 80% by weight of ortho neo pentyl glycol and about 20% by weight of styrene. Another example of the polyester resin is a combination of iso neo pentyl glycol, methyl methyl acrylate, and styrene. Room temperature catalysts such as methyl ethyl ketone peroxide (MEKP) and room temperature accelerators may be used for curing the resin at room temperature without the need for external heating. In another embodiment, high temperature setting catalysts such as benzyl peroxide (BPO) may be used. The artificial stone layer 101*a* may comprise multiple layers, wherein the lower layers may comprise porous and lightweight fillers.

In an embodiment, in the case of the door 501, the edges of the door 501 comprise a composite that further comprises glass fibers and cenospheres or glass spheres and thermoset or thermoplastic resin.

The artificial stone layer 101*a* and the glass fiber reinforced resin layer 101*b* are manufactured at the same time, whereby bonding between the artificial stone layer 101*a* and the glass fiber reinforced resin layer 101*b* is formed in situ. After the surface material 101 is cured, the surface material is polished using known polishing processes utilized in the granite industry. An example of a method for manufacturing a decorative surface on a furniture structure such as the door 501, comprises depositing a layer 101*a* of an artificial stone mix on a glass fiber reinforced resin layer 101*b* with polyester resin on a planar work surface, bordering the artificial stone mix with a metal strip, continuing and adjoining the glass fiber reinforced resin layer 101*b* from under the artificial stone layer 101*a* in directions away from the border of the artificial stone layer 101*a*, and applying pressure on the composite created. Pressure in the range of, for example, 1 $kg/cm^2$ to 10 $kg/cm^2$ may be applied on the composite. The pressure may be applied, for example, by a vibrating compactor, wherein the compactor is a hydraulic compactor or a pneumatic compactor. Vibro compaction may be applied for better compaction. Vacuum may also be applied for better compaction and removal of air cavities.

Figure 6:
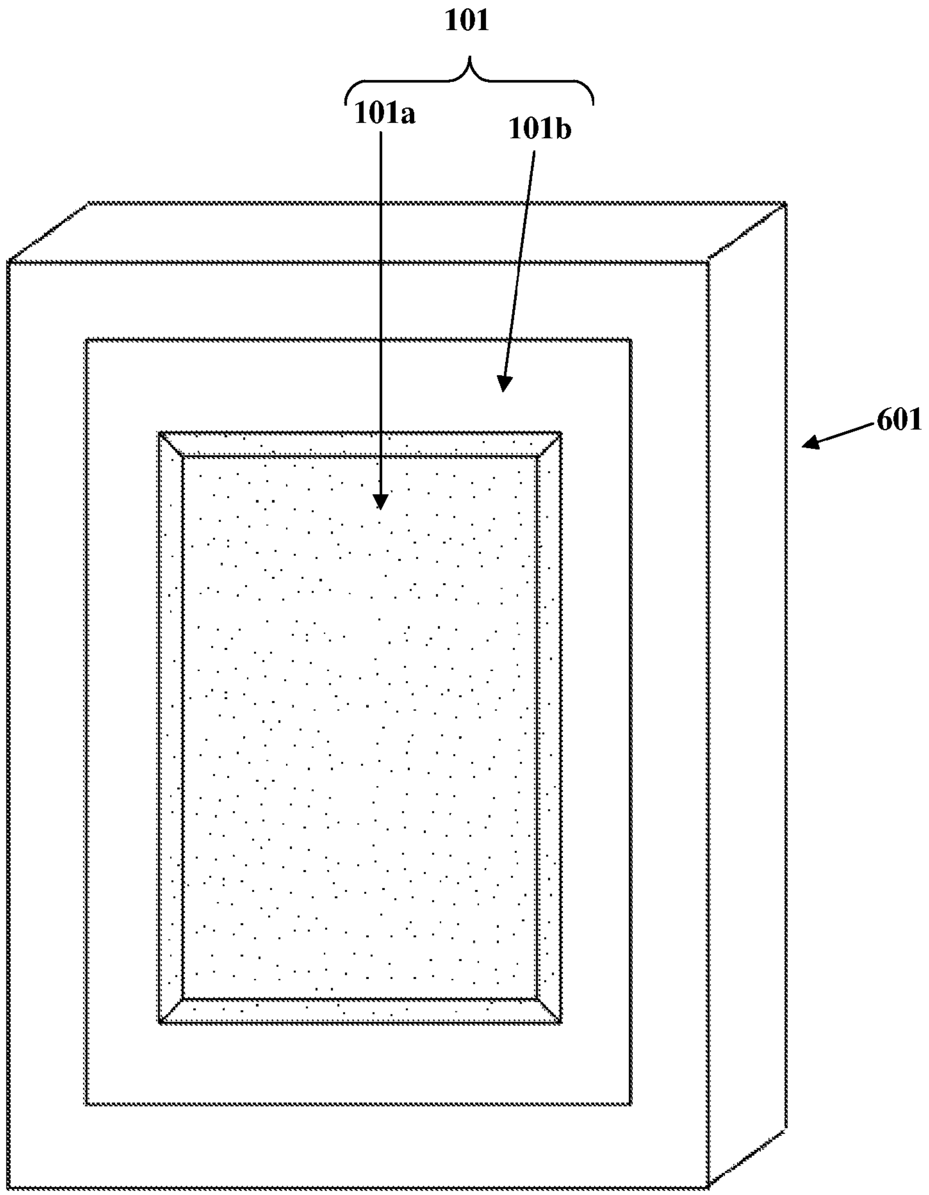
FIG. 6 exemplarily illustrates a door manufactured using the surface material comprising a layer of artificial stone and an adjoining layer of fiber reinforced resin, wherein the layer of artificial stone is at a higher plane than the adjoining layer of fiber reinforced resin.

FIG. 6 exemplarily illustrates a door 601 manufactured using the surface material 101 comprising a layer 101*a* of artificial stone and an adjoining layer 101*b* of fiber reinforced resin. In an embodiment, the plane of the artificial stone layer 101*a* is higher than the plane of the adjoining fiber reinforced resin layer 101*b* as exemplarily illustrated in FIG. 6. This differential height serves two purposes. First, in the polishing operation on the artificial stone layer 101*a*, the abrasive polishing heads does not make contact with the adjoining glass fiber reinforced resin layer 101*b*, as the glass fiber reinforced resin layer 101*b* may be lower than the artificial stone layer 101*a*. Secondly, the artificial stone layer 101*a* projects out of the surface creating an improved decorative effect. A door 601 with a projecting artificial stone layer 101*a* is exemplarily illustrated in FIG. 6. The decorative material 102 may be deposited on a planar work surface prior to depositing the layer 101*a* of artificial stone mix. The surface of the decorative material 102 may be relatively planar.

The work surface may comprise silicone rubber sheets resting on the work surface. The work surface may also comprise Teflon® sheets, polyvinyl alcohol or a silicone applied release agents for the artificial stone layer 101*a*. Finally, the artificial stone layer 101*a* is polished by techniques applied in granite polishing.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A door structure, comprising:

a central core material;

a surface material of said door configured to cover said core material, said surface material comprising:

a layer of artificial stone, said artificial stone comprising a combination of particulates and resin; and a layer of fiber reinforced resin partially or fully encompassing said artificial stone on all sides and surfaces except one or more exposed decorative surfaces;

whereby said layer of fiber reinforced resin binds together said surface material and said central core material.

2. The door structure of claim 1, further comprising a decorative material embedded within said layer of said artificial stone, wherein said decorative material comprises one or more of ornamental glass, semiprecious stones, metal art, colored quartz, glass, and stone jewelry.

3. The door structure of claim 1, further comprising a separator material partially defining a boundary edge of said layer of said artificial stone wherein said separator material is one of a metal strip, a fiber strip, and a combination thereof.

4. A table structure, comprising:

a central core material;

a surface material of said table, configured to cover said core material, said surface material comprising:

a layer of artificial stone, said artificial stone comprising a combination of particulates and resin; and a layer of fiber reinforced resin partially or fully encompassing said artificial stone on all sides and surfaces except one or more exposed decorative surfaces;

whereby said layer of fiber reinforced resin binds together said surface material and said central core material.

* * * * *